United States Patent
Chen et al.

(10) Patent No.: US 7,123,976 B2
(45) Date of Patent: Oct. 17, 2006

(54) CAPACITY MANAGEMENT SYSTEM AND METHOD

(75) Inventors: Yi-Kuang Chen, Hsin-Chu (TW);
Jin-Yng Hwang, Sindian (TW);
Tsung-Lin Chen, Taipei (TW);
Hsin-Chen Wu, Hsin-chu (TW);
Cheng-Heng Sun, Hsinchu (TW);
Jenn-Tsair Liao, Hsinchu (TW);
Ching-Ping Chen, Hsin-Chu (TW);
Yu-Cheng Chang, Linyuan Township, Kaohsiung County (TW)

(73) Assignee: Taiwan Semiconductor Manufacturing Co., Ltd., Hsinchu (TW)

( * ) Notice: Subject to any disclaimer, the term of this patent is extended or adjusted under 35 U.S.C. 154(b) by 0 days.

(21) Appl. No.: 11/010,556

(22) Filed: Dec. 13, 2004

(65) Prior Publication Data

US 2006/0129260 A1   Jun. 15, 2006

(51) Int. Cl.
*G06F 19/00* (2006.01)
(52) U.S. Cl. .................. 700/100; 700/97; 700/99
(58) Field of Classification Search .......... 700/99–100, 700/101, 103, 106, 107, 97
See application file for complete search history.

(56) References Cited

U.S. PATENT DOCUMENTS

| | | | | |
|---|---|---|---|---|
| 5,260,868 A | * | 11/1993 | Gupta et al. | 700/100 |
| 5,971,585 A | * | 10/1999 | Dangat et al. | 700/102 |
| 6,049,742 A | * | 4/2000 | Milne et al. | 700/99 |
| 2005/0234579 A1 | * | 10/2005 | Asmundsson et al. | 700/102 |

* cited by examiner

*Primary Examiner*—Zoila Cabrera
(74) *Attorney, Agent, or Firm*—Thomas, Kayden, Horstemeyer & Risley (57) ABSTRACT

A capacity management system and method. The system includes a demand management module and a planning engine. The demand management module receives a demand comprising a request for a quantity of a device and a corresponding required date. The planning engine converts original planning buckets with varying bucket lengths into target planning buckets that have substantially identical bucket lengths. The planning engine further retrieves a cycle time of the device, and selects one of the target planning buckets accordingly. The planning engine also plans a capacity in the selected target planning bucket according to the quantity of the device.

9 Claims, 7 Drawing Sheets

CAPACITY MANAGEMENT SYSTEM AND METHOD

BACKGROUND

The present disclosure relates generally to supply chain management, and, more particularly, to capacity management systems and methods using planning buckets with substantially identical bucket length.

In the supply of products, the supply chain performs the functions of material purchasing, transformation of materials into intermediate and finished products, and distribution of finished products to clients. Supply chain management has become important in meeting the goals of reduced inventory, increased productivity, and enhanced competitiveness. Manufacturing and distribution facilities have limited resources and capacity, hence, not every client request may be met. For example, some requests may be promised but unfulfilled, some clients may receive inadequate supply, and other requests may be rejected. Consequently, effective management of capacity in supply chain management, without excess capacity loss, has become an important aspect for a product supplier who needs to control manufacture or distribution.

In the supply chain, clients transmit demands to a supplier. The demand may include a request for a particular quantity of a device by a specific date. The supplier plans its internal or external manufacturing schedule according to these received demands, and allocates capacity for manufacturing products to satisfy each client. After receiving orders corresponding to demands from clients, the supplier starts to manufacture the products.

Figure 1:
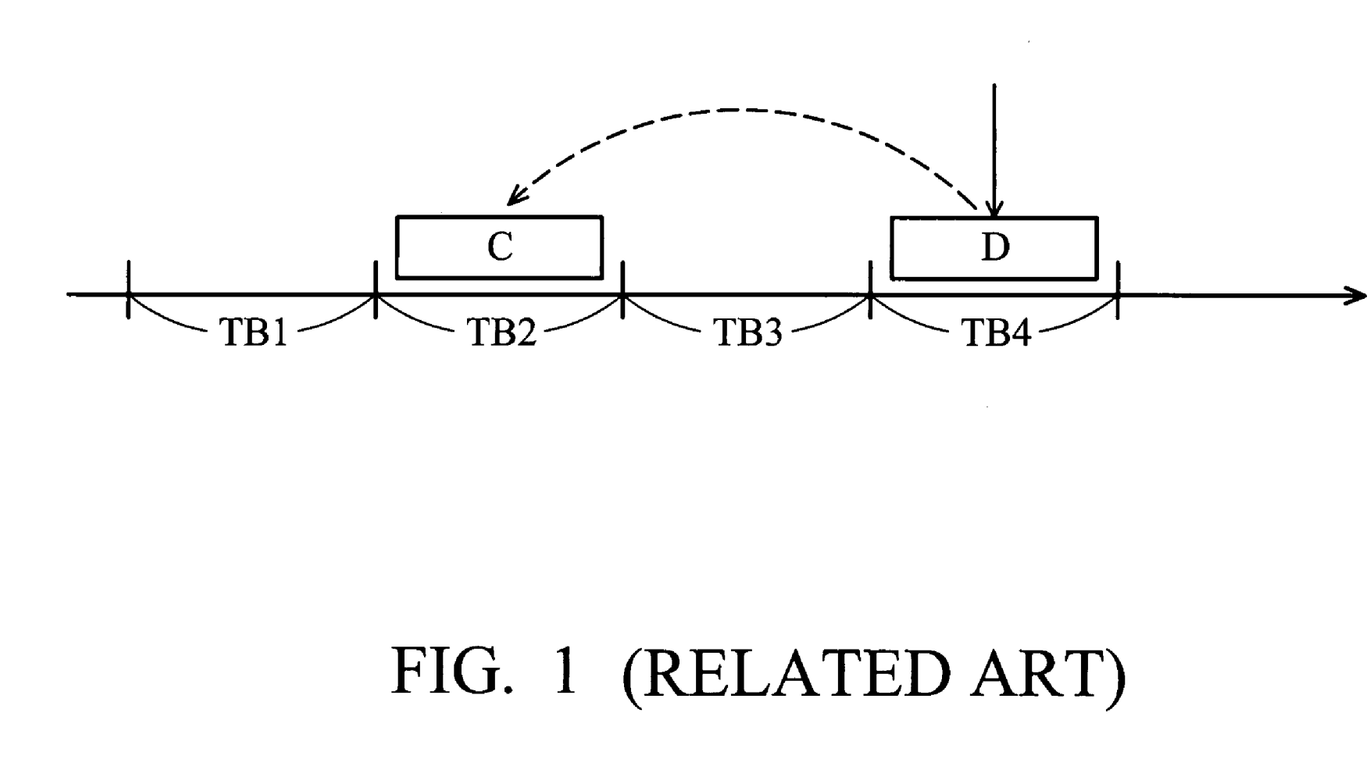
FIG. 1 is a schematic diagram illustrating a capacity behavior.

Conventionally, a planning approach divides a continuous planning horizon into discrete time buckets, such as months, and plans capacity for respective time buckets. For example, in FIG. 1, if a demand D for a device is specified in time bucket TB4 and a cycle time for the device is 2 time buckets, the planning bucket containing a capacity consumption point for the demand D falls in time bucket TB2, and a capacity C is consumed for the demand D.

Figure 2A:
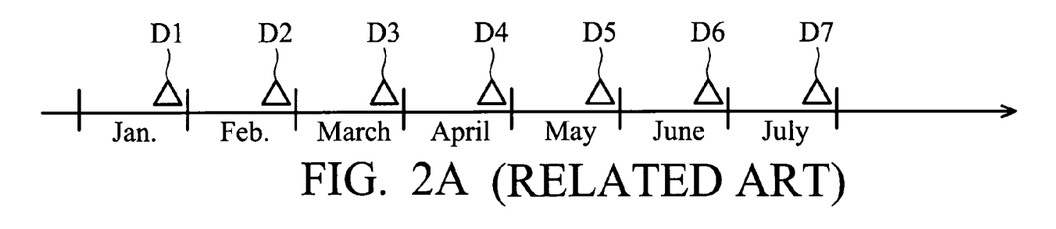
FIGS. 2A–2C are schematic diagrams illustrating an irregular capacity plan.
Figure 2B:
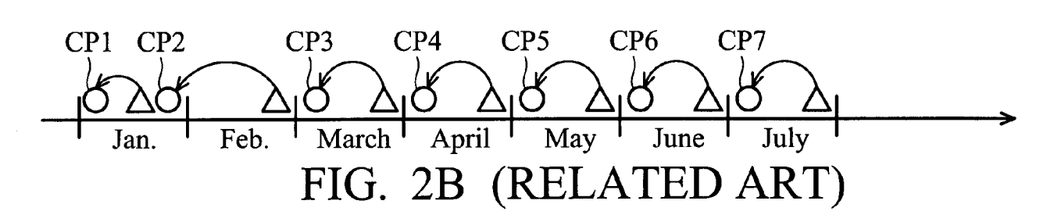
Figure 2C:
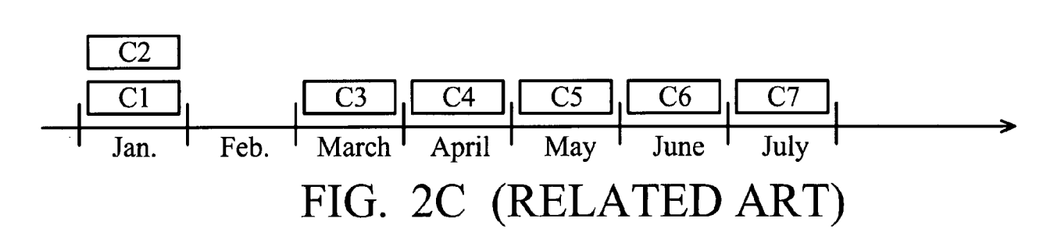

Since bucket lengths vary from month to month, however, if two substantially identical demands are specified in different time buckets, the planning buckets must be determined according to corresponding bucket lengths, thereby causing irregular plan results. For example, FIG. 2A illustrates an example wherein the time buckets are determined according to calendar month, and each month (January through July) has a demand (D1~D7) for a device having a 29-day cycle time. The corresponding capacity consumption points (CP1~CP7) for respective demands are illustrated in FIG. 2B. Since the bucket length of February is 28 days, the capacity consumption point CP2 for demand D2 falls in January, and the specified capacity in January comprises capacity C1 for demand D1 and capacity C2 for demand D2 as shown in FIG. 2C. In the example, the plan result is irregular, and the same situation will occur as the cycle time is about multiples of 30 days (e.g., 29, 30, 31, 59, 60, 61, 89, 90, 91, etc). Expected capacity consumption, however, should be balanced and smooth for all planning buckets to facilitate effective long-term planning. The conventional mechanism, however, is unable to generate smooth capacity consumption results for capacity management.

SUMMARY

Embodiments of the present invention are proposed to address the aforementioned issues. It is noted that these embodiments, among others, are applicable to any factory, service supplier, and/or product.

Accordingly, an object of the present disclosure is to provide capacity management systems and methods using planning buckets with substantially identical bucket length.

To achieve the above object, the present invention provides a capacity management system and method. According to one embodiment of the invention, the system includes a demand management module and a planning engine. The demand management module receives a demand comprising a request for a quantity of a device and a corresponding required date. The planning engine converts original planning buckets with varying bucket lengths into target planning buckets that have substantially identical bucket lengths. The planning engine further retrieves a cycle time of the device, and selects one of the target planning buckets according to the cycle time, the required date, and the target planning bucket length. The planning engine also plans a capacity in the selected target planning bucket according to the quantity of the device.

The planning engine further retrieves a route of the device, and consumes available capacity according to the route and the quantity of the device. The available capacity for the target planning bucket is based on its corresponding original bucket length.

The planning engine further reallocates the planning buckets with substantially identical bucket lengths as "target planning buckets".

According to another embodiment of the invention, a capacity management method is provided. First, a demand comprising a request for a quantity of a device and a corresponding required date are received. The original planning buckets with varying bucket lengths are converted to "target planning buckets" that have substantially identical bucket lengths. Then, a cycle time of the device is retrieved, and one of the target planning buckets is selected according to the cycle time, the required date, and the target planning bucket length. Thereafter, a required capacity in the selected target planning bucket is planned according to the demand quantity of the device.

A route of the device is further retrieved, and available capacity is consumed according to the route and the quantity of the device. The available capacity for the target planning bucket is based on its corresponding original bucket length.

Further, the planning buckets with substantially identical bucket lengths could further split into more fine scale such as 10 days as the target planning bucket length.

The above-mentioned method may take the form of program code embodied in a tangible media. When the program code is loaded into and executed by a machine, the machine becomes an apparatus for practicing the disclosed methods.

BRIEF DESCRIPTION OF THE DRAWINGS

The aforementioned objects, features and advantages will become apparent by referring to the following detailed description of several embodiments with reference to the accompanying drawings, wherein.

DESCRIPTION

The present disclosure provides systems and methods for overcoming conventional capacity management problems.

Figure 3:
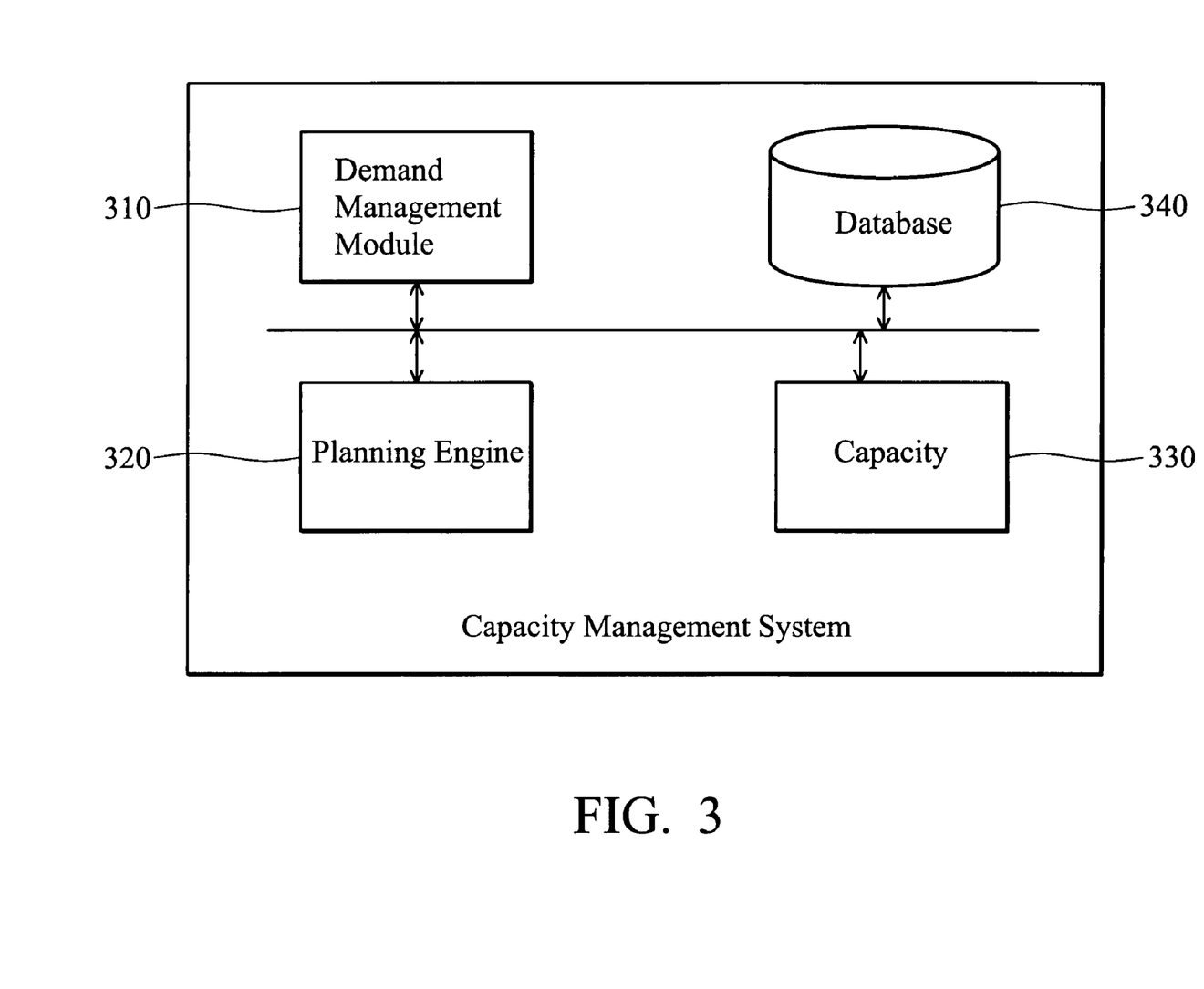
FIG. 3 is a schematic diagram illustrating the architecture of the capacity management system according to one embodiment of the present invention.

FIG. 3 is a schematic diagram illustrating the architecture of the capacity management system according to one embodiment of the present invention. The capacity management system 300 includes a demand management module 310, a planning engine 320 to plan a capacity 330 of a factory or manufacturer, and a database 340 storing cycle times and routes corresponding to respective devices or device designs.

Figure 4:
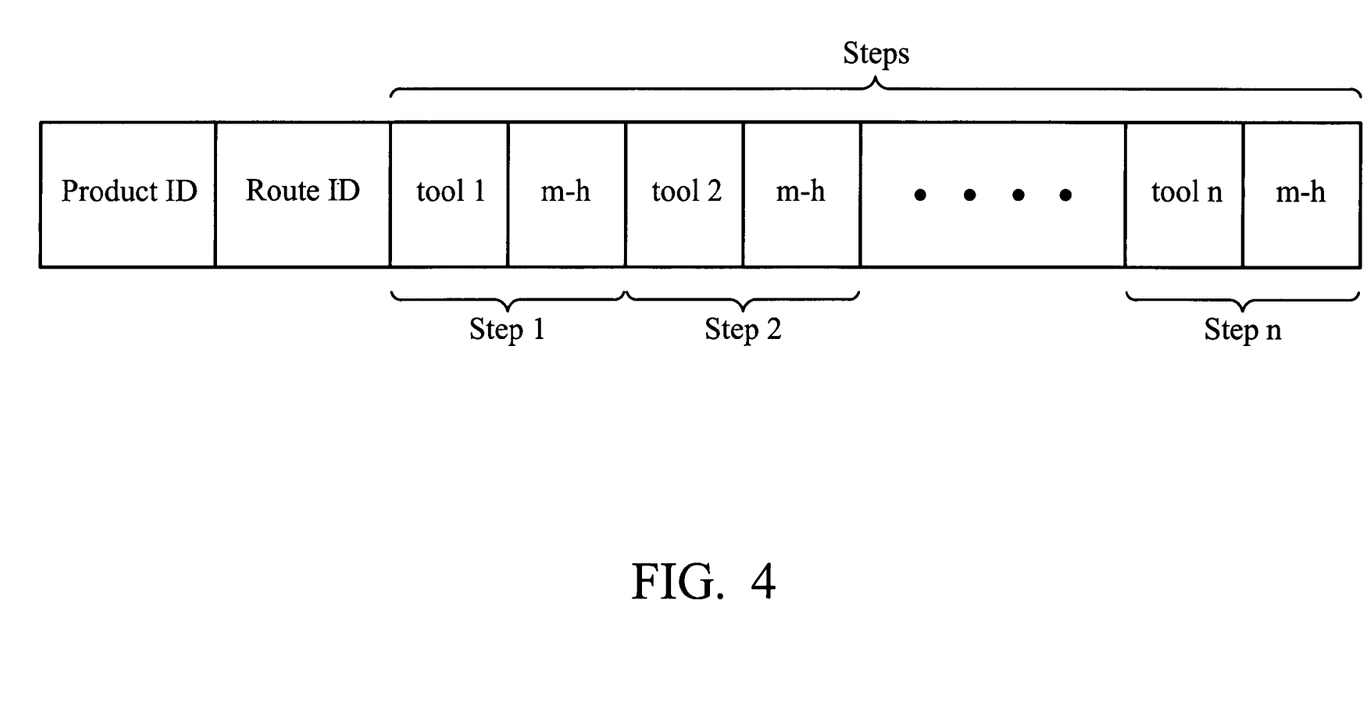
FIG. 4 illustrates the route structure according to one embodiment of the present invention.

FIG. 4 illustrates the route structure according to one embodiment of the present invention. The route structure includes a product ID, route ID, and a plurality of steps. Each device or product has its own route, and each step records the tool and corresponding machine hours (m-h) spent thereon. It is understood that the route defines the production manner of the product. The content of the route further includes a device name of the product, a step sequence indicating steps that the product should be processed thereon in order, resource ID indicating the equipment tool used by respective step, a capacity consumption rate of respective equipment tool, and a cycle time for the equipment tool.

The demand management module 310 receives demands from clients. Each demand comprises a request for a particular quantity of a device and a corresponding required date. It is understood that several embodiments of the present invention can be integrated with a web-based platform, which provides online service and displays related information to clients.

The planning engine 320 converts original planning buckets with varying bucket lengths into target planning buckets that have substantially identical bucket lengths. For example, the bucket lengths for January, February and others are each converted to target planning buckets of 30 days, called plan days. It is noted that the original calendar days for January, February, March, April, . . . , and December are 31, 28, 31, 30, . . . , and 31 days, respectively. In other words, for some embodiments, the bucket lengths for each month are set to 30 days, regardless of how many actual days are in that month. It is understood that the bucket length of each planning unit in the embodiment of the present invention may be various, such as 29, 30, 31, 59, 60, 61, 89, 90, and 91 days, or a length approximated to a multiple of 30 days.

The present invention keeps real resource capacity for the capacity constraint planning. It is understood that the original (available) capacity for each planning bucket is based on its corresponding original bucket length (calendar day). The benefit of keeping original total machine capacity is that it could ensure the engine plan based on the real available capacity. For example, the available capacity for January is 31 times the capacity per day, for February is 28 times the capacity per day, and for April is 30 times the capacity per day. The capacity management system 300 may provide an interface for setting the substantially identical bucket length. Additionally, the planning buckets with substantially identical bucket length can be split into sub-planning buckets for more precise planning. It is understood that the planning buckets can be split according to the common factors of the bucket length. For example, if the bucket length is 30 days, the planning buckets can be further split into sub-planning buckets with 15 (30/2), 10 (30/3) or 6 (30/5) days. The split planning buckets will be suitable and useful for further break down the bucket into smaller scale. By this way, it could avoid traditional month to week hard to equivalent split troubles.

The planning engine 320 selects a target planning bucket from the planning buckets according to the cycle time, the required date, and the target planning bucket length of the device. The target planning bucket may be selected by further considering the target planning bucket capacity. The planning engine 320 further consumes the available capacity in the target planning bucket according to the route, cycle time, and the quantity of the device, thereby planning and managing the capacity in the target planning bucket.

The basic planning behavior for one demand is introduced as follows. The demand defines a specific device, required date and quantity. A route is then retrieved according to the device. The available capacity of respective equipment tool corresponding to respective steps defined by the route is consumed. The capacity consumption process is introduced in detail as follows. First, the equipment tools used by one step for the device are retrieved from the route. Then, a consumption point (planning bucket) is found according to the required date recorded in the demand and the cycle time defined in the route. Thereafter, a consumption quantity on the equipment tool is calculated according to the required quantity recorded in the demand and the consumption rate of the equipment tool. Then, the available capacity of the equipment tool at the consumption point is consumed by the consumption quantity. The capacity consumption process is repeated for all steps for the device.

Figure 5:
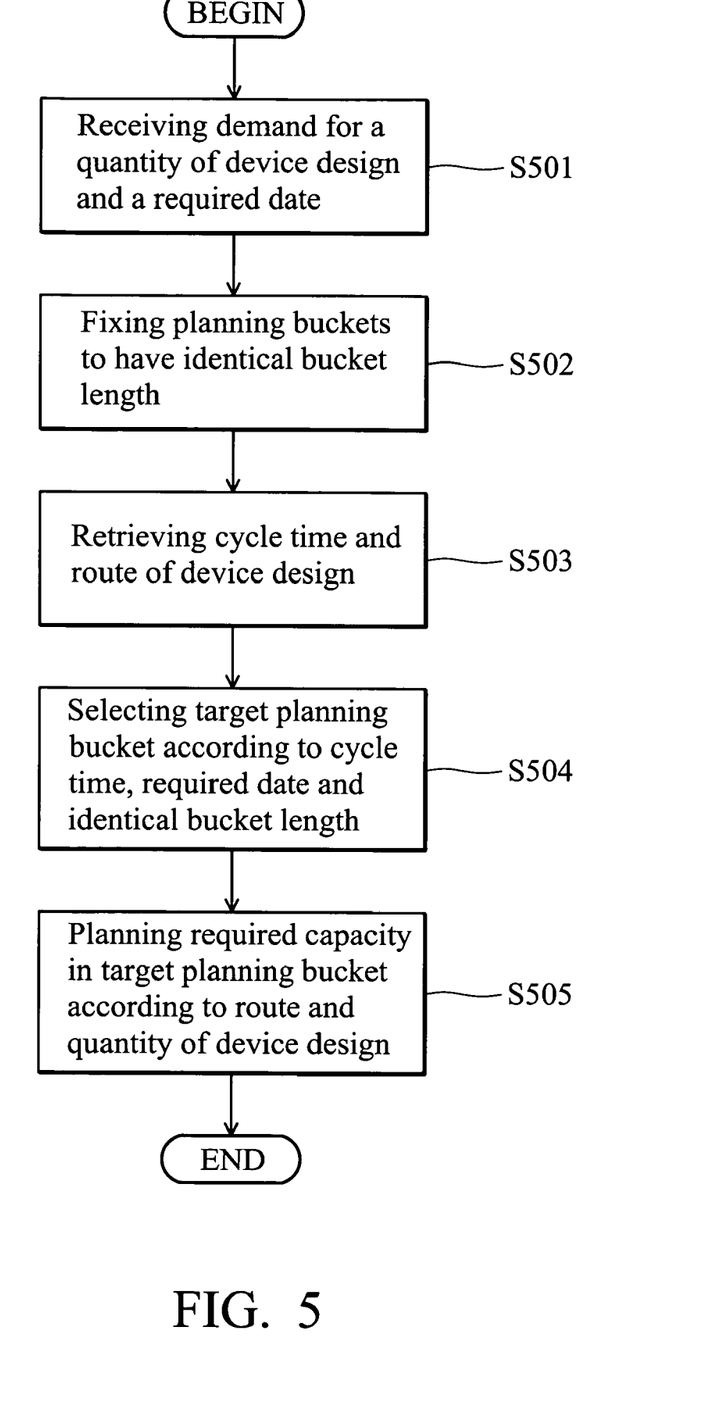
FIG. 5 is a flowchart showing the process of capacity management according to one embodiment of the present invention.

FIG. 5 is a flowchart showing the process of capacity management according to one embodiment of the present invention.

First, in step S501, at least one demand comprising a request for a quantity of a device and a corresponding required date is received. Then, in step S502, the planning buckets with various bucket lengths are fixed and converted to target planning buckets, so that each bucket has an substantially identical bucket length and the bucket capacity are kept as real total available machine hours of the specific bucket. Then, in step S503, a cycle time and a route of the device is retrieved. Thereafter, in step S504, one of the target planning buckets is selected from the target planning buckets according to the cycle time, the required date, and the target planning bucket length. Then, in step S505, a capacity in the selected target planning bucket is planned and scheduled to consume an available capacity for the selected target planning bucket according to the route and the quantity of the device.

Similarly, the planning buckets with substantially identical bucket lengths can be split into sub-planning buckets according to the common factors of the bucket length, and the planning result may be more precise.

Figure 6A:
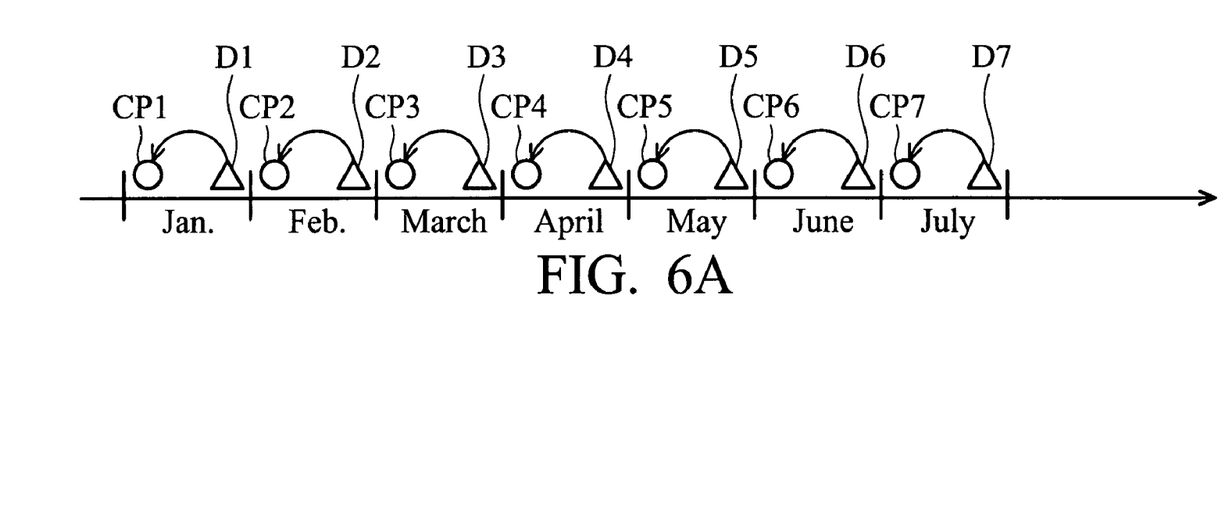
FIGS. 6A and 6B are schematic diagrams illustrating a capacity plan according to one embodiment of the present invention.
Figure 6B:
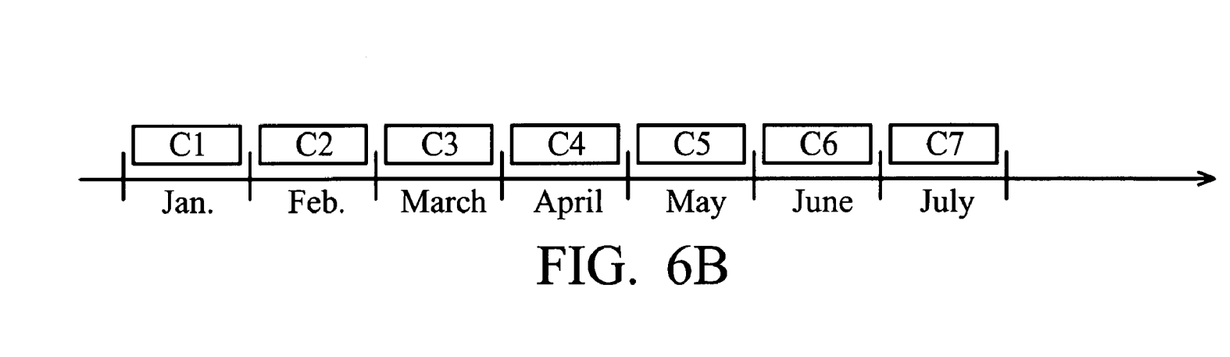

Referring again to the example provided in FIG. 2A, each month (January through July) has a demand (D1~D7) for a device having a 29 day cycle time. According to several embodiments of the present invention, the original planning buckets are converted to target planning buckets that have substantially identical bucket lengths (e.g., 30 days). That is, the bucket length of February is also adjusted to 30 days. The corresponding capacity consumption points (CP1~CP7) for respective demands is illustrated in FIG. 6A, and the specified capacity in January only comprises capacity C1 for demand D1 and the specified capacity in February comprises capacity C2 for demand D2 as shown in FIG. 6B. Accordingly, the plan result is balanced and enables a smooth and reasonable capacity planning.

Figure 7:
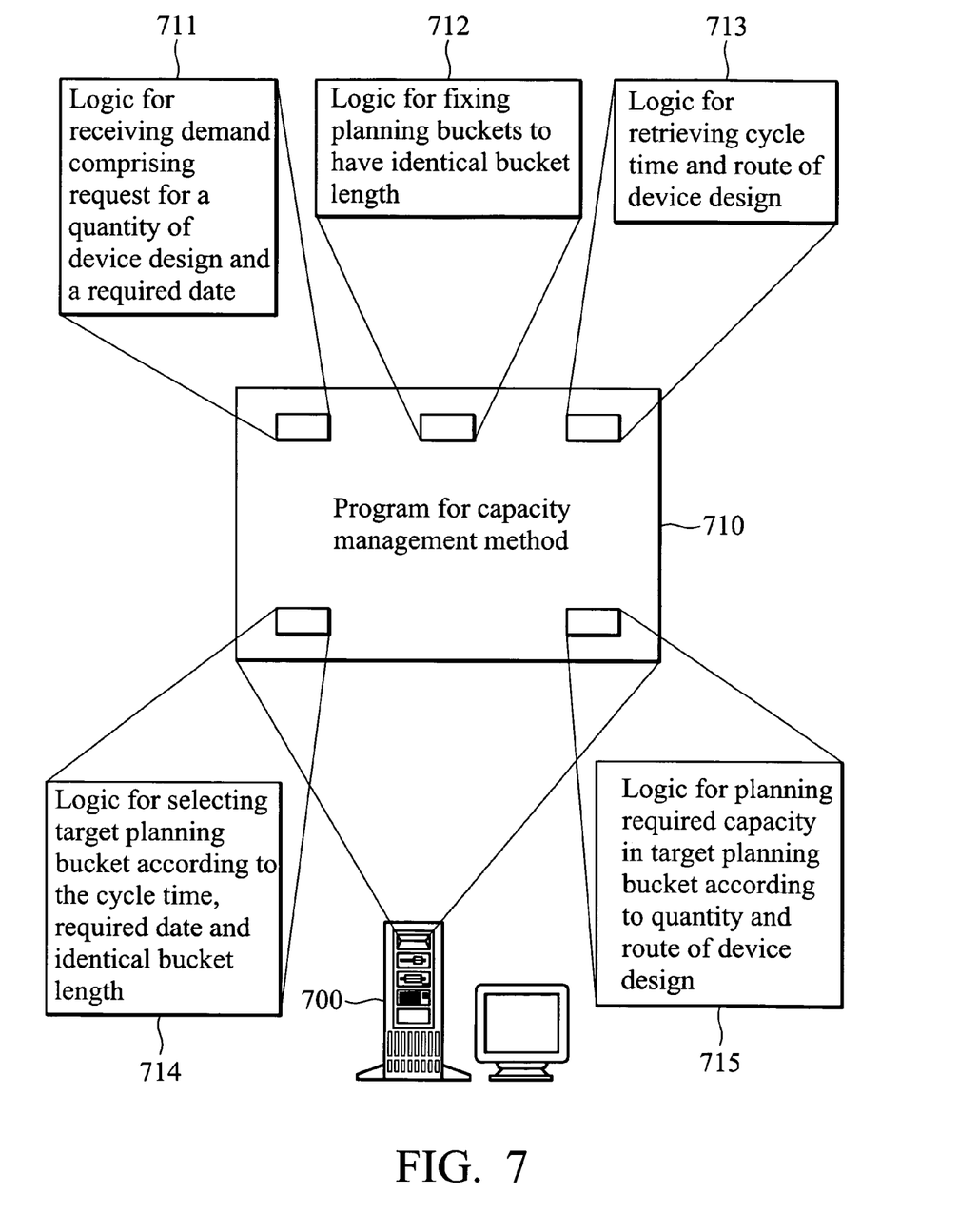
FIG. 7 is a schematic diagram illustrating a storage medium for storing a computer program for execution of the capacity management method according to one embodiment of the present invention.

FIG. 7 is a diagram of a storage medium for storing a computer program providing the capacity management method according to one embodiment of the present invention. The computer program product comprises a storage medium 710 having computer readable program code embodied in the medium for use in a computer system 700. The computer readable program code comprises computer readable program code 711 for receiving at least one demand comprising a request for a quantity of a device and a corresponding required date. The program also comprises computer readable program code 712 for converting original planning buckets with varying bucket lengths into target planning buckets that have substantially identical bucket lengths. The program further comprises computer readable program code 713 for retrieving a cycle time and a route of the device. Additionally, the program comprises computer readable program code 714 for selecting one of the target planning buckets from the planning buckets according to the cycle time, the required date, and the target planning bucket length. Moreover, the program comprises computer readable program code 715 for planning a capacity in the selected target planning bucket according to the quantity and route of the device.

The disclosed embodiments provide capacity management systems and methods using planning buckets with substantially identical bucket lengths, thereby avoiding the troubles of different length of the month and generating more reasonable capacity planning results.

The embodiments of the methods and systems, or certain aspects or portions thereof, may take the form of program code (i.e., executable instructions) embodied in tangible media, such as floppy diskettes, CD-ROMS, hard drives, or any other machine-readable storage medium, wherein, when the program code is loaded into and executed by a machine, such as a computer, the machine thereby becomes an apparatus for practicing the disclosed methods. The methods and systems of the present invention may also be embodied in the form of program code transmitted over some transmission medium, such as electrical wiring or cabling, through fiber optics, or via any other form of transmission, wherein, when the program code is received and loaded into and executed by a machine, such as a computer, the machine becomes an apparatus for practicing the disclosed methods. When implemented on a general-purpose processor, the program code combines with the processor to provide a unique apparatus that operates analogously to application specific logic circuits.

Although several embodiments of the present invention have been described, it is not intended to limit the invention to the precise embodiments disclosed herein. Those skilled in this technology can still make various alterations and modifications without departing from the scope and spirit of this invention.

What is claimed is:

1. A manufacturing system comprising:
a capacity management system, the capacity management system further comprising:
a demand management module configured to receive at least one demand, the demand comprising a request for a quantity of a device and a required date corresponding to the request; and
a planning engine configured to convert original planning buckets having varying bucket lengths into target planning buckets having substantially identical bucket lengths, retrieve a cycle time and a route of the device, select one of the target planning buckets according to the cycle time, the required date, and the target planning bucket length, and decreases an available capacity for the selected target planning bucket according to the route and the quantity of the device, wherein the available capacity for the selected target planning bucket is based on the corresponding original planning bucket length.

2. The system of claim 1, wherein the planning engine is further configured to split the target planning buckets into sub-planning buckets.

3. A capacity management method for use in a manufacturing system, comprising the steps of:
receiving a request for a quantity of a device;
receiving a required date corresponding to the request;
converting original planning buckets with various bucket lengths into target planning buckets having substantially identical bucket lengths;
retrieving a cycle time and a route of the device;
selecting one of the target planning buckets according to the cycle time, the required date, and the target planning bucket length; and
decreasing an available capacity for the selected target planning bucket according to the route and the quantity of the device, wherein the available capacity for the selected target planning bucket is based on the corresponding original planning bucket length.

4. The method of claim 3 further comprising
constraining the accumulated required capacity below the total available capacity of specific equipment.

5. The method of claim 3 further comprising the step of splitting the target planning buckets into sub-planning buckets.

6. A machine-readable storage medium having a computer program, the computer program, when executed, causing a computer to perform a capacity management method in a manufacturing system, the method comprising the steps of:
receiving a request for a quantity of a device;
receiving a required date corresponding to the request;
converting original planning buckets with varying bucket lengths into target planning buckets having substantially identical bucket lengths;
retrieving a cycle time and a route of the device;
selecting one of the target planning buckets according to the cycle time, the required date, and the target planning bucket length; and
decreasing an available capacity for the selected target planning bucket according to the route and the quantity of the device, wherein the available capacity for the selected target planning bucket is based on the corresponding original planning bucket length.

7. The storage medium of claim 6, wherein the method further comprises the step of splitting the target planning buckets into sub-planning buckets.

8. A manufacturing system, comprising:
means for receiving a request for a quantity of a device;
means for receiving a required date corresponding to the request;

means for converting original planning buckets with various bucket lengths into target planning buckets having substantially identical bucket lengths;

means for retrieving a cycle time and a route of the device;

means for selecting one of the target planning buckets according to the cycle time, the required date, and the target planning bucket length; and means for decreasing an available capacity for the selected target planning bucket according to the route and the quantity of the device, wherein the available capacity for the selected target planning bucket is based on the corresponding original planning bucket length.

9. A manufacturing system comprising a planning engine, the planning engine comprising:

means for converting original planning buckets into target planning buckets, the original planning buckets having varying bucket lengths, the target planning buckets having substantially identical bucket lengths;

means for retrieving a cycle time and a route of a device;

means for selecting one of the target planning buckets, the target planning bucket being selected according to the cycle time, a required date of the device, and a target planning bucket length; and means for decreasing an available capacity for the selected target planning bucket according to the route and the quantity of the device, wherein the available capacity for the selected target planning bucket is based on the corresponding original planning bucket length.

* * * * *